United States Patent
Yamada et al.

(10) Patent No.: US 9,446,725 B2
(45) Date of Patent: Sep. 20, 2016

(54) STRUCTURE FOR VEHICLE BODY FRONT PORTION

(71) Applicants: Kenjiro Yamada, Toyota (JP); Shintaro Kitakata, Nissin (JP)

(72) Inventors: Kenjiro Yamada, Toyota (JP); Shintaro Kitakata, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/428,618

(22) PCT Filed: Dec. 3, 2013

(86) PCT No.: PCT/IB2013/002689
§ 371 (c)(1),
(2) Date: Mar. 16, 2015

(87) PCT Pub. No.: WO2014/087219
PCT Pub. Date: Jun. 12, 2014

(65) Prior Publication Data
US 2015/0232050 A1 Aug. 20, 2015

(30) Foreign Application Priority Data

Dec. 4, 2012 (JP) .................................. 2012-265286

(51) Int. Cl.
*B60R 19/34* (2006.01)
*B62D 25/08* (2006.01)
*B62D 21/15* (2006.01)

(52) U.S. Cl.
CPC ............. *B60R 19/34* (2013.01); *B62D 21/152* (2013.01); *B62D 25/082* (2013.01)

(58) Field of Classification Search
CPC .. B62D 25/08; B62D 25/082; B62D 25/085; B62D 21/15; B62D 21/152; B60R 19/26; B60R 19/34; B60R 19/24
USPC .............. 296/187.09, 187.1, 193.09, 203.02; 293/132, 133, 154, 155
See application file for complete search history.

(56) References Cited

U.S. PATENT DOCUMENTS 7,296,824 B2 * 11/2007 Yasui ................... B62D 21/152
280/784
7,651,155 B2 * 1/2010 Tan ......................... B60R 19/34
293/133

(Continued)

FOREIGN PATENT DOCUMENTS

EP 2330018 A1 6/2011
JP 2004-314899 A 11/2004

(Continued)

*Primary Examiner* — Gregory Blankenship
(74) *Attorney, Agent, or Firm* — Oliff PLC

(57) ABSTRACT

A structure for vehicle body front portion includes: a front side member; an apron member including an end positioned at a front side of a vehicle with respect to an end of the front side member; a bumper reinforcement including a vehicle width direction outside portion with a first and a second coupling portions; a coupling member that couples the front end of the front side member and the front end of the apron member; an inner energy absorbing portion disposed at the front end of the front side member at a front side of the vehicle; the inner energy absorbing portion coupling the coupling member and the first coupling portion; and an outer energy absorbing portion disposed at the front end of the apron member at a front side of the vehicle; and the outer energy absorbing portion coupling the coupling member and the second coupling portion.

11 Claims, 11 Drawing Sheets

(56) References Cited

U.S. PATENT DOCUMENTS

| | | | | |
|---|---|---|---|---|
| 8,419,116 B2* | 4/2013 | Boettcher | ............... | B60R 19/24 293/133 |
| 8,496,287 B2* | 7/2013 | Matsuura | ................ | B60R 19/34 293/132 |
| 8,608,231 B1* | 12/2013 | Mendivil | ................ | B60R 19/34 293/133 |
| 9,056,634 B2* | 6/2015 | Watanabe | ............ | B62D 21/152 |
| 2001/0033094 A1* | 10/2001 | Sano | .................... | B62D 21/152 296/203.02 |
| 2003/0090127 A1* | 5/2003 | Saeki | ................... | B62D 21/152 296/187.12 |
| 2005/0077711 A1 | 4/2005 | Yasui et al. | | |
| 2006/0066115 A1* | 3/2006 | Haneda | .................... | F16F 7/12 293/133 |
| 2007/0176443 A1* | 8/2007 | Yasuhara | ............. | B62D 21/152 293/133 |
| 2008/0116719 A1* | 5/2008 | Bae | ......................... | B60R 19/34 296/187.09 |
| 2009/0140546 A1* | 6/2009 | Okabe | .................... | B60R 19/18 296/187.09 |
| 2009/0146455 A1* | 6/2009 | Honji | .................... | B62D 21/152 296/187.09 |
| 2009/0261602 A1* | 10/2009 | Karlander | ............... | B60R 19/34 293/132 |
| 2009/0315365 A1* | 12/2009 | Baccouche | .......... | B62D 25/082 296/205 |
| 2010/0127531 A1* | 5/2010 | Yasuhara | ............. | B62D 21/152 296/187.09 |
| 2010/0259033 A1* | 10/2010 | Okabe | .................... | B60R 19/34 280/734 |
| 2011/0148151 A1* | 6/2011 | Abe | ........................ | B60R 19/34 296/203.02 |
| 2012/0007373 A1 | 1/2012 | Boettcher et al. | | |
| 2012/0248820 A1* | 10/2012 | Yasui | ..................... | B60R 19/34 296/187.09 |
| 2012/0313398 A1* | 12/2012 | Shin | .................... | B62D 21/152 296/187.1 |
| 2013/0207417 A1* | 8/2013 | Kihara | .................... | B60R 19/34 296/187.09 |
| 2013/0249245 A1* | 9/2013 | Sekiguchi | ............ | B62D 25/082 296/187.09 |
| 2014/0008924 A1* | 1/2014 | Han | ....................... | B60R 19/18 293/133 |
| 2014/0008936 A1* | 1/2014 | Kim | ........................ | B60R 19/34 296/187.09 |
| 2014/0375082 A1* | 12/2014 | Watanabe | ............ | B62D 21/152 296/187.1 |
| 2015/0028606 A1* | 1/2015 | Eckert | .................. | B62D 25/082 293/133 |
| 2015/0069785 A1* | 3/2015 | Sakakibara | .......... | B62D 25/085 296/187.1 |
| 2015/0108775 A1* | 4/2015 | Nakanishi | ............... | B60R 19/34 293/133 |
| 2015/0175109 A1* | 6/2015 | Mori | ...................... | B60R 19/12 293/133 |
| 2015/0232050 A1* | 8/2015 | Yamada | .................. | B60R 19/34 296/187.1 |
| 2015/0274209 A1* | 10/2015 | Basappa | ............... | B62D 21/155 180/271 |

FOREIGN PATENT DOCUMENTS

| | | |
|---|---|---|
| JP | 2005-112173 A | 4/2005 |
| JP | 2005-231435 A | 9/2005 |
| JP | 2005-231436 A | 9/2005 |
| JP | 2007-190964 A | 8/2007 |
| JP | 2009-171032 A | 7/2009 |
| JP | 2010-083448 A | 4/2010 |
| JP | 2010-083453 A | 4/2010 |
| JP | 2010-083455 A | 4/2010 |
| JP | 2010-184706 A | 8/2010 |
| JP | 4695176 B2 | 6/2011 |
| JP | 2013-199233 A | 10/2013 |
| JP | 2014-012428 A | 1/2014 |
| WO | 2009/072450 A1 | 6/2009 |

* cited by examiner

STRUCTURE FOR VEHICLE BODY FRONT PORTION

BACKGROUND OF THE INVENTION

1. Field of the Invention

The present invention relates to a structure for vehicle body front portion.

2. Description of Related Art

A structure for vehicle body front portion that includes a front side member, an apron member, and a bumper reinforcement is known. The apron member is disposed outside in the vehicle width direction of the front side member. The bumper reinforcement is disposed at the front side of vehicle with respect to the front side member and the apron member. A vehicle width direction outside portion of the bumper reinforcement is inclined toward the rear side of the vehicle as approaching the outside in the vehicle width direction.

Some structures for vehicle body front portion include a coupling member, an inner energy absorbing portion, and an outer energy absorbing portion. The coupling member couples a front end of the front side member and a front end of the apron member. The inner energy absorbing portion is disposed at the front end of the front side member at a front side of the vehicle. The outer energy absorbing portion is disposed at the front side of the vehicle in the front end of the apron member (for example, see Japanese Patent Application Publication No. 2010-83448 (JP 2010-83448 A) and Japanese Patent Application Publication No. 2010-83453 (JP 2010-83453 A)). The inner energy absorbing portion couples the coupling member and the outside portion in the vehicle width direction of the bumper reinforcement. The outer energy absorbing portion couples the coupling member and the outside portion in the vehicle width direction of the bumper reinforcement.

Such structure for vehicle body front portion includes the inner energy absorbing portion whose overall length is longer than the overall length of the outer energy absorbing portion. In view of this, in the case where a collision load acts on the inner energy absorbing portion and the outer energy absorbing portion from the front side of the vehicle, a large amount of the inner energy absorbing portion may remain than the outer energy absorbing portion. As a result, the outer energy absorbing portion arranged in the vehicle width direction with respect to the inner energy absorbing portion may remain uncrushed and be left. Therefore, there is room for improvement to reduce remaining of the uncrushed outer energy absorbing portion and improve energy absorption performance during collision.

SUMMARY OF THE INVENTION

The present invention provides a structure for vehicle body front portion that allows improving energy absorption performance during collision.

A structure for vehicle body front portion according to an aspect of the present invention includes: a front side member; an apron member disposed outside in a vehicle width direction with respect to the front side member; the apron member including a front end positioned at a front side of a vehicle with respect to a front end of the front side member; a bumper reinforcement disposed at a front side of the vehicle with respect to the front side member and the apron member; the bumper reinforcement extending in a vehicle width direction; the bumper reinforcement including a vehicle width direction outside portion with a first coupling portion and a second coupling portion; the second coupling portion being positioned outside in the vehicle width direction and a rear side of the vehicle with respect to the first coupling portion; a coupling member that couples the front end of the front side member and the front end of the apron member; an inner energy absorbing portion disposed at the front end of the front side member at a front side of the vehicle; the inner energy absorbing portion coupling the coupling member and the first coupling portion; and an outer energy absorbing portion disposed at the front end of the apron member at a front side of the vehicle; and the outer energy absorbing portion coupling the coupling member and the second coupling portion.

According to the above-described aspect, the front end of the apron member disposed outside in the vehicle width direction of the front side member is positioned at the front side of the vehicle with respect to the front end of the front side member. Therefore, in the case where a collision load acts on the inner energy absorbing portion and the outer energy absorbing portion from the front side of the vehicle, the outer energy absorbing portion can be crushed. This allows reducing remaining of the uncrushed outer energy absorbing portion, thus improving the energy absorption performance during collision.

In the above-described aspect, the apron member may include an extending portion between a vehicle front-rear direction middle portion and a front portion of the apron member. The extending portion may head for a bottom side of the vehicle as approaching the front side of the vehicle. The front portion of the apron member may form a straight line portion extending in a vehicle front-rear direction.

According to the above-described aspect, the extending portion between the vehicle front-rear direction middle portion and the front portion of the apron member heads for the bottom side of the vehicle as approaching the front side of the vehicle. However, the front portion of the apron member (front end side portion including the front end) forms the straight line portion extending in the vehicle front-rear direction. Therefore, in the case where a collision load acts on the front end of the apron member from the front side of the vehicle, the straight line portion can receive the collision load in the vehicle front-rear direction.

In the above-described aspect, the extending portion may include a boundary to divide the apron member into a front divided portion and a rear divided portion.

According to the above-described aspect, the extending portion includes the boundary that divides the apron member into the front divided portion and the rear divided portion. Accordingly, in the case where a collision load acts on the apron member from the front side of the vehicle and then only the front divided portion is deformed, for example, only the front divided portion may be exchanged. This allows improving repairability of the apron member.

Moreover, the boundary is formed at the extending portion. Accordingly, the apron member can be divided into the front divided portion and the rear divided portion to an appropriate length. Accordingly, compared with the case where the apron member is continuously formed across the overall length, the apron member can be easily manufactured.

In the above-described aspect, the front divided portion may have a lower strength than the rear divided portion.

According to the above-described aspect, the front divided portion is formed at a low strength compared with the rear divided portion. Accordingly, when a collision load acts on the outer energy absorbing portion from the front side of the vehicle, the front divided portion (portion with low strength) can absorb energy during collision in addition to outer energy absorbing portion.

In the above-described aspect, the coupling member may include an inner coupling portion and an outer coupling portion. The inner coupling portion may be coupled to a front end of the front side member. The outer coupling portion may be positioned at a front side of the vehicle with respect to the inner coupling portion. The outer coupling portion may be coupled to a front end of the apron member. The straight line portion may have a rear end positioned at a rear side of the vehicle with respect to the inner coupling portion.

According to the above-described aspect, the rear end of the straight line portion is positioned at the rear side of the vehicle with respect to the inner coupling portions, which are coupling portions with the front end of the front side member at the coupling member. Accordingly, the straight line portion can receive the collision load in the vehicle front-rear direction more effectively.

In the above-described aspect, the extending portion may curve to form a convex toward a rear side of the vehicle and a bottom side of the vehicle.

According to the above-described aspect, the extending portion curves to form a convex toward the rear side of the vehicle and the bottom side of the vehicle. Here, as described above, the front end of the apron member is positioned at the front side of the vehicle with respect to the front end of the front side member. Therefore, compared with the case where the front end of the apron member is disposed at the same position with the front end of the front side member, for example, a curvature radius at the extending portion can be increased. This allows reducing stress concentration on the extending portion in the case where a collision load acts on the front end of the apron member from the front side of the vehicle.

In the above-described aspect, the coupling member may include an inner coupling portion, an outer coupling portion, and a center coupling portion. The inner coupling portion may be coupled to a rear end of the inner energy absorbing portion and the front end of the front side member. The outer coupling portion may be positioned at the front side of the vehicle with respect to the inner coupling portion. The outer coupling portion may be coupled to a rear end of the outer energy absorbing portion and the front end of the apron member. The center coupling portion may couple the inner coupling portion and the outer coupling portion.

According to the above-described aspect, the coupling member includes the inner coupling portions, the outer coupling portions, and the center coupling portions. The inner coupling portions are coupled to the front end of the front side member. The outer coupling portions are coupled to the front end of the apron member. The center coupling portions couple the inner coupling portions and the outer coupling portions. Accordingly, for example, in the case where a collision load is input from the collision body to the vehicle width direction outside portion of the bumper reinforcement in a range overlapping with the apron member in the vehicle width direction such as small overlap collision or oblique collision, the collision load transmitted to the outer coupling portions via the outer energy absorbing portion can be transmitted to the inner coupling portions via the center coupling portions. Consequently, the collision load input to the vehicle width direction outside portion of the bumper reinforcement in the range overlapping with the apron member in the vehicle width direction can be dispersed to the apron member and the front side member.

Furthermore, the outer coupling portions are positioned at the front side of the vehicle with respect to the inner coupling portions. Therefore, the collision load transmitted to the outer coupling portions via the outer energy absorbing portion can be efficiently transmitted to the inner coupling portions via the center coupling portions.

In the above-described aspect, the center coupling portion may be inclined toward the rear side of the vehicle as approaching inside in the vehicle width direction.

According to the above-described aspect, the center coupling portions are inclined toward the rear side of the vehicle as approaching the inside of the vehicle width direction. Accordingly, the collision load transmitted to the outer coupling portions via the outer energy absorbing portion can be more efficiently transmitted to the inner coupling portions via the center coupling portions.

In the above-described aspect, the coupling member may include a front side plate and a rear side plate divided in a vehicle front-rear direction. The front side plate and the rear side plate may overlap with one another at the inner coupling portion and the outer coupling portion while separated from one another at the center coupling portion.

According to the above-described aspect, the front side plate and the rear side plate at the coupling member overlap with one another at the inner coupling portions and the outer coupling portions. However, the front side plate and the rear side plate are separated from one another at the center coupling portions. Accordingly, when the front side plate and the rear side plate are assembled (when the front side plate and the rear side plate are overlapped with one another at the inner coupling portions and the outer coupling portions), the front side plate and the rear side plate can be inhibited to interfere at the center coupling portions. This allows improving assemblability of the front side plate and the rear side plate.

In the above-described aspect, the outer energy absorbing portion may include a pair of ridgelines formed that are formed at portions of outside in the vehicle width direction, and may be arranged in the vehicle width direction and each extending in the vehicle front-rear direction. The apron member may include A sidewall portion that is positioned outside in the vehicle width direction and may be positioned between the pair of ridgelines in the vehicle width direction.

According to the above-described aspect, the pair of ridgelines are formed at portions of the outer energy absorbing portion outside in the vehicle width direction, respectively. The pair of ridgelines is arranged in the vehicle width direction and extends in the vehicle front-rear direction. The sidewall portion at the apron member outside in the vehicle width direction is positioned between the pair of ridgelines in the vehicle width direction. Accordingly, the collision load acting on the outer energy absorbing portion can be efficiently transmitted to the sidewall portion of the apron member via the pair of ridgelines.

In the above-described aspect, the inner energy absorbing portion may include a first ridgeline and a first bead. The first ridgeline may extend in the vehicle front-rear direction. The first bead may be across the first ridgeline and extending in the vehicle width direction: The outer energy absorbing portion may include a second ridgeline and a second bead. The second ridgeline may extend in the vehicle front-rear direction. The second bead may be across the second ridgeline and extending in the vehicle width direction. The second bead may have a length longer than the first bead along the vehicle width direction.

According to the above-described aspect, the second bead formed at the outer energy absorbing portion and extending in the vehicle width direction is formed longer than the first bead formed at the inner energy absorbing portion extending in the vehicle width direction in the length along the vehicle width direction. Therefore, in the case where a collision load acts on the outer energy absorbing portion from the front side of the vehicle, the outer energy absorbing portion can be more crushed.

As detailed above, according to the present invention, energy absorption performance during collision can be improved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereafter, a description will be given of one embodiment of the present invention with reference to the drawings.

In each of the drawings, the arrow UP, the arrow FR, and the arrow OUT indicate the top side in a vehicle top-bottom direction, the front side in a vehicle front-rear direction, and the outside in a vehicle width direction (right side of the vehicle), respectively.

Figure 1:
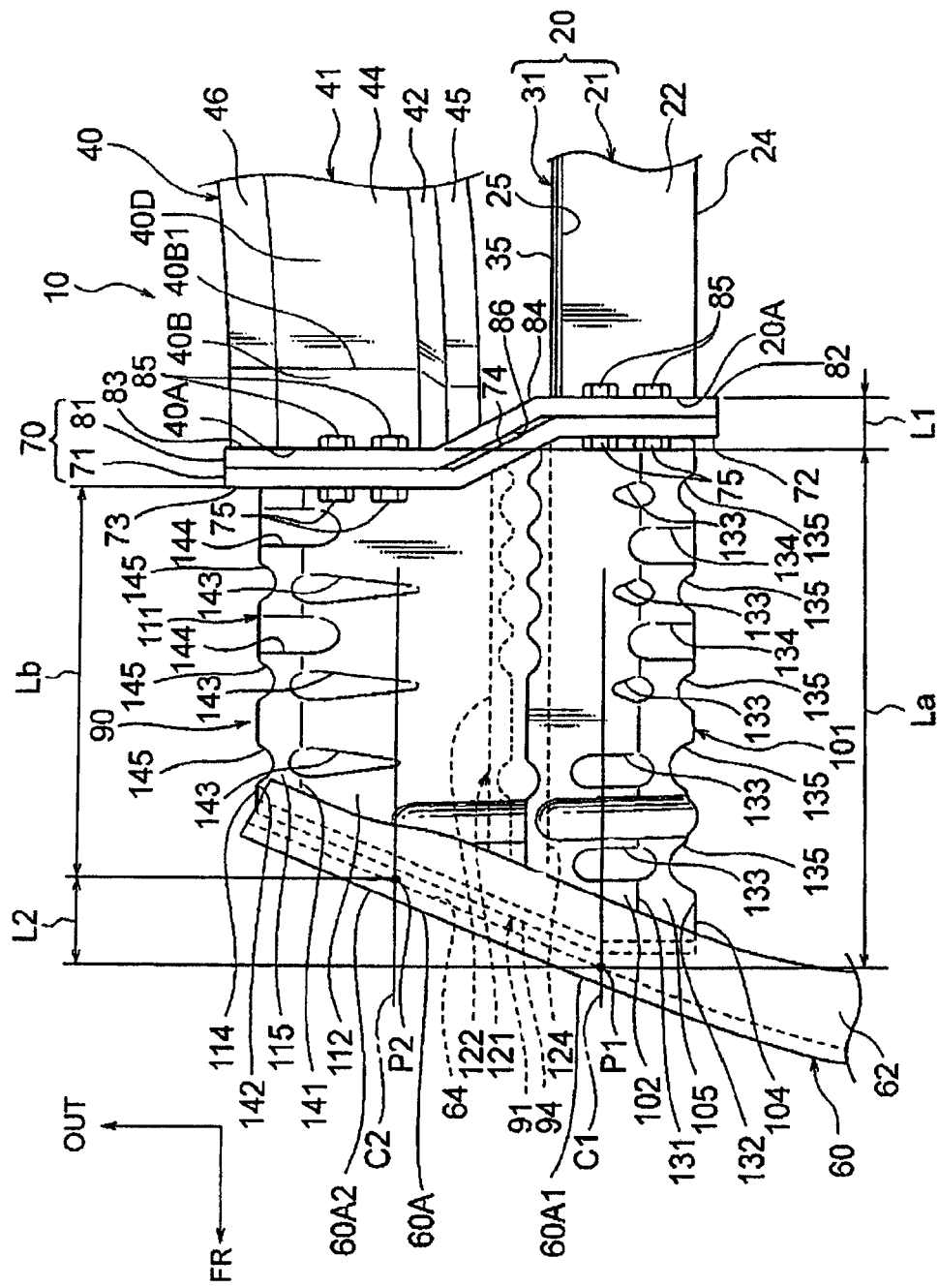
FIG. 1 is a plan view of a structure for vehicle body front portion according to one embodiment of the present invention.
Figure 2:
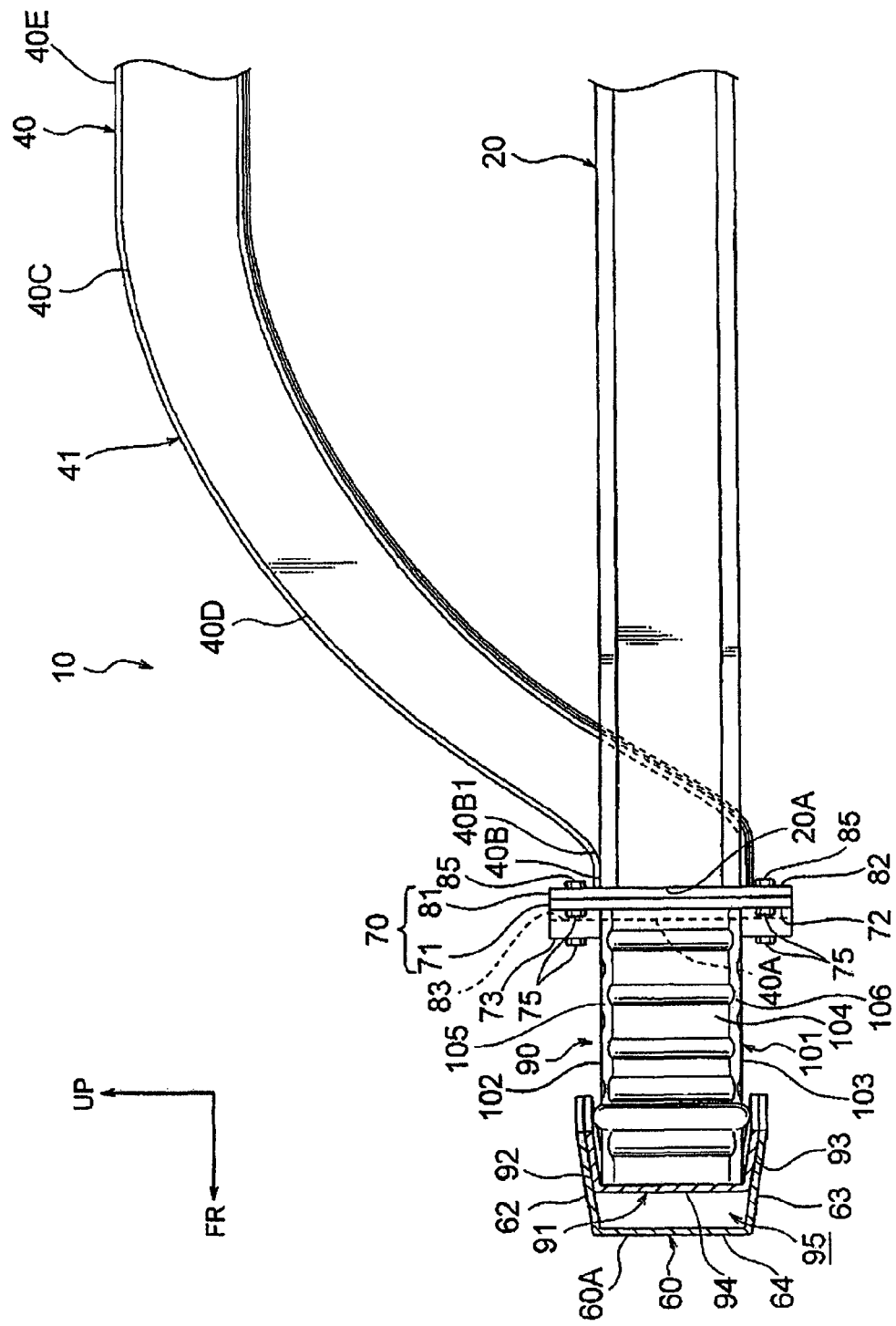
FIG. 2 is a side view including a partial cross section of the structure for vehicle body front portion shown in FIG. 1.
Figure 3:
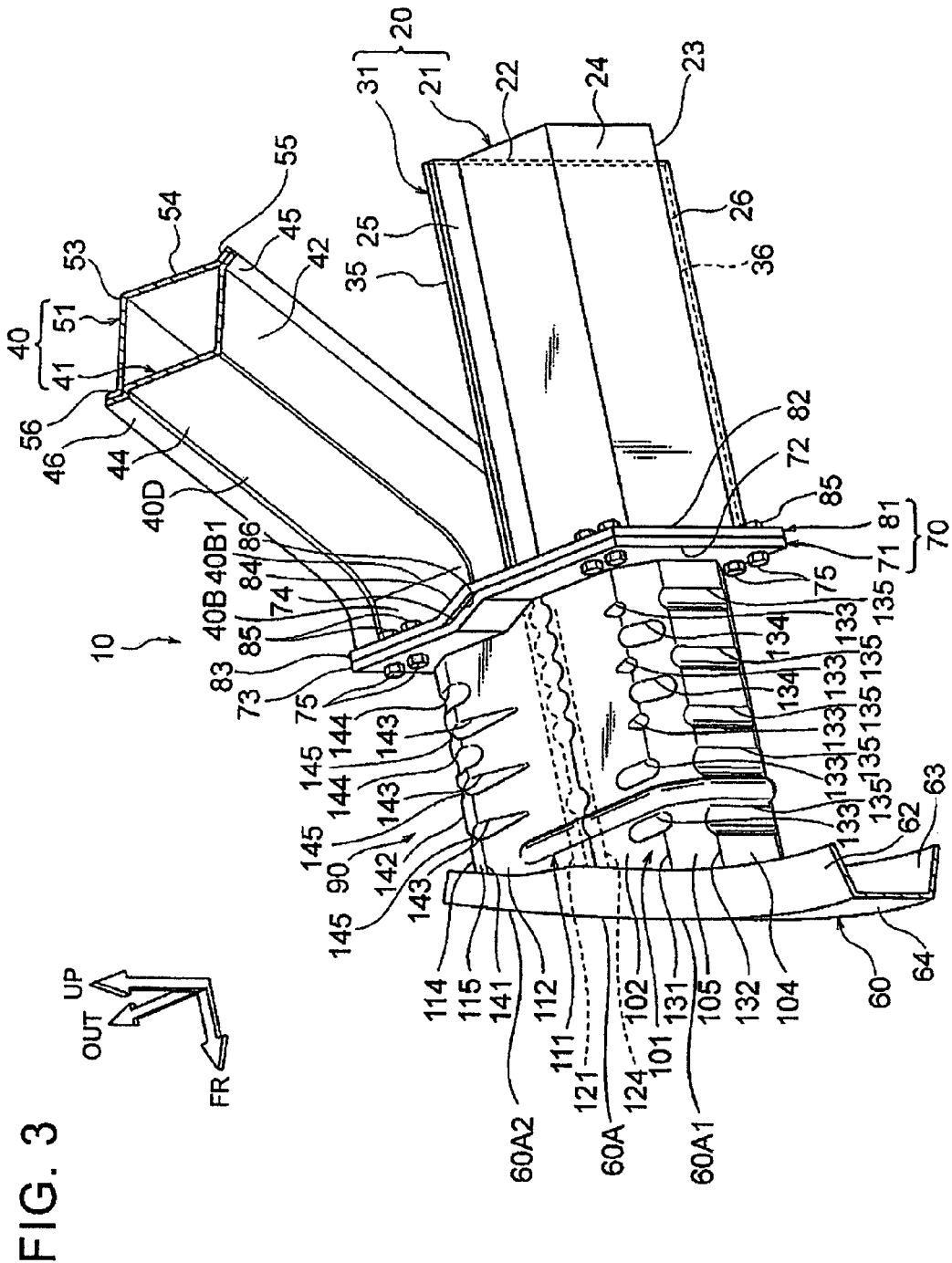
FIG. 3 is a perspective view of the structure for vehicle body front portion shown in FIG. 1.

As shown in FIG. 1 to FIG. 3, a structure for vehicle body front portion 10 according to one embodiment of the present invention includes a front side member 20, an apron member 40, a bumper reinforcement 60, a coupling member 70, and a crash box 90. The structure for vehicle body front portion 10 is formed symmetrically centering the center of the vehicle width direction. The following describes a configuration of the structure for vehicle body front portion 10 at the right side of the vehicle. The description on the configuration of the structure for vehicle body front portion 10 at the left side of the vehicle is omitted.

The front side member 20 is disposed outside in the vehicle width direction with respect to the center of the front of the vehicle body in the vehicle width direction and extends in the vehicle front-rear direction. The front side member 20 includes a front side member inner 21 and a front side member outer 31 divided in the vehicle width direction.

The front side member inner 21 forms a cross-sectional hat shape opening outside in the vehicle width direction. That is, the front side member inner 21 includes a top wall portion 22, a bottom wall portion 23, a sidewall portion 24, a top flange 25, and a bottom flange 26 as shown in FIG. 2 and FIG. 3. The top wall portion 22 and the bottom wall portion 23 face in the vehicle top-bottom direction. The sidewall portion 24 couples the end portions of the top wall portion 22 and the bottom wall portion 23 inside in the vehicle width direction. The top flange 25 projects from the end portion outside in the vehicle width direction of the top wall portion 22 to the top side of the vehicle. The bottom flange 26 projects from the end portion outside in the vehicle width direction of the bottom wall portion 23 to the bottom side of the vehicle.

The front side member outer 31 is formed in a flat plate shape with a thickness in the vehicle width direction. A top end portion 35 of the front side member outer 31 is coupled to the top flange 25 of the front side member inner 21. A bottom end portion 36 of the front side member outer 31 is coupled to the bottom flange 26 of the front side member inner 21. Thus, the front side member inner 21 and the front side member outer 31 are coupled to one another. Accordingly, the cross section along the direction perpendicular to the longitudinal direction of the front side member 20 forms a closed cross section.

The apron member 40 is disposed outside of the front side member 20 in the vehicle width direction and extends in the vehicle front-rear direction. The apron member 40 includes an apron member upper 41 and an apron member lower 51 divided in the vehicle top-bottom direction.

As shown in FIG. 3, the apron member upper 41 includes a sidewall portion 42, a top wall portion 44, an inner flange 45, and an outer flange 46. The sidewall portion 42 constitutes the sidewall of the apron member upper 41 inside of the vehicle width direction. The end portion of the top wall portion 44 inside in the vehicle width direction is coupled to the end portion of the sidewall portion 42 at the top side of the vehicle. The inner flange 45 projects from the end portion at the bottom side of the vehicle on the sidewall portion 42 to inside in the vehicle width direction. The outer flange 46 projects from the end portion outside in the vehicle width direction of the top wall portion 44 to outside in the vehicle width direction.

Meanwhile, the apron member lower 51 includes a sidewall portion 53, a bottom wall portion 54, an inner flange 55, and an outer flange 56. The sidewall portion 53 constitutes the sidewall of the apron member lower 51 outside in the vehicle width direction. The end portion of the bottom wall portion 54 outside in the vehicle width direction is coupled to the end portion of the sidewall portion 53 at the bottom side of the vehicle. The inner flange 55 projects from the end portion inside in the vehicle width direction of the bottom wall portion 54 to inside in the vehicle width direction. The outer flange 56 projects from the end portion at the top side of the vehicle on the sidewall portion 53 to outside in the vehicle width direction. The inner flange 55 is coupled to the inner flange 45 of the apron member upper 41 while the outer flange 56 is coupled to the outer flange 46 of the apron member upper 41. Thus, the apron member upper 41 and the apron member lower 51 are coupled to one another. Accordingly, the cross section along the direction perpendicular to the longitudinal direction of the apron member 40 forms a closed cross section.

As shown in FIG. 1, the front end side portion (front portion) including a front end 40A of the apron member 40 forms a straight line portion 40B extending in the vehicle front-rear direction (see also FIG. 2). The straight line portion 40B, which forms the front portion of the apron member 40, extends toward the front side of the vehicle. The front end 40A of the apron member 40 is positioned at the front side of the vehicle with respect to the front end 20A of the front side member 20. Meanwhile, as shown in FIG. 2, an extending portion 40D is disposed between a vehicle front-rear direction middle portion 40C and the straight line portion 40B of the apron member 40. The extending portion 40D heads for the bottom side of the vehicle as approaching the front side of the vehicle. The extending portion 40D curves to form a convex toward the front side of the vehicle and the top side of the vehicle.

A portion 40E disposed at the rear side of the vehicle with respect to the vehicle front-rear direction middle portion 40C of the apron member 40 is formed in a straight line extending in the vehicle front-rear direction. Although not particularly illustrated, the rear end of the apron member 40 is coupled to a front pillar.

The bumper reinforcement 60 supports a bumper cover (not shown). The bumper reinforcement 60 is disposed at the front side of the vehicle with respect to the front side member 20 and the apron member 40 and extends in the vehicle width direction. As shown in FIG. 3, a vehicle width direction outside portion 60A (portion outside in the vehicle width direction) of the bumper reinforcement 60 is inclined toward the rear side of the vehicle as approaching outside in the vehicle width direction. The vehicle width direction outside portion 60A includes a first coupling portion 60A1 and a second coupling portion 60A2. The second coupling portion 60A2 is positioned outside in the vehicle width direction and at the rear side of the vehicle with respect to the first coupling portion 60A1 (see also FIG. 1). The bumper reinforcement 60 forms a cross-sectional C shape opening to the rear side of the vehicle. That is, the bumper reinforcement 60 includes a top wall portion 62 and a bottom wall portion 63, which are opposed in the vehicle top-bottom direction, and a front wall portion 64, which couples the end portions of the top wall portion 62 and the bottom wall portion 63 at the front side of the vehicle.

A coupling member 70 couples the front end 20A of the front side member 20 and the front end 40A of the apron member 40 shown in FIG. 1. The coupling member 70 includes a front side plate 71 and a rear side plate 81 divided in the vehicle front-rear direction. The front side plate 71 and the rear side plate 81 are disposed to have a thickness in the vehicle front-rear direction. The front side plate 71 includes an inner coupling portion 72, an outer coupling portion 73, and a center coupling portion 74. The rear side plate 81 includes an inner coupling portion 82, an outer coupling portion 83, and a center coupling portion 84.

The inner coupling portion 72 of the front side plate 71 is coupled to the rear end of an crash box inner 101 in the crash box 90, which will be described later. The outer coupling portion 73 of the front side plate 71 is coupled to the rear end of a crash box outer 111 in the crash box 90, which will be described later. The center coupling portion 74 couples the end portion of the inner coupling portion 72 outside in the vehicle width direction and the end portion of the outer coupling portion 73 inside in the vehicle width direction.

Meanwhile, the inner coupling portion 82 of the rear side plate 81 is coupled to the front end 20A of the front side member 20. The outer coupling portion 83 of the rear side plate 81 is coupled to the front end 40A of the apron member 40. More specifically, the front end 20A of the front side member 20 includes a flange (not shown) with a thickness in the vehicle front-rear direction. The inner coupling portion 82 is coupled to the flange (not shown). Similarly, the front end 40A of the apron member 40 includes a flange (not shown) with a thickness in the vehicle front-rear direction. The outer coupling portion 83 is coupled to the flange (not shown). The center coupling portion 84 couples the end portion of the inner coupling portion 82 outside in the vehicle width direction and the end portion of the outer coupling portion 83 inside in the vehicle width direction.

A plurality of weld nuts 85 are secured to the inner coupling portion 82 and the outer coupling portion 83 of the rear side plate 81. The inner coupling portion 72 and the outer coupling portion 73 of the front side plate 71 include respective through holes (not shown) coaxially with the plurality of respective weld nuts 85. Then, bolts 75 are inserted through the plurality of through holes from the front side of the vehicle and then the bolts 75 are screwed into the weld nuts 85. Accordingly, the inner coupling portion 72 and the outer coupling portion 73 of the front side plate 71 are coupled to the inner coupling portion 82 and the outer coupling portion 83 of the rear side plate 81.

As described above, the front end 40A of the apron member 40 is positioned at the front side of the vehicle with respect to the front end 20A of the front side member 20. Correspondingly, the outer coupling portions 73 and 83 are positioned at the front side of the vehicle with respect to the inner coupling portions 72 and 82. Thus, the outer coupling portions 73 and 83 and the inner coupling portions 72 and 82 are shifted in the vehicle front-rear, direction. Correspondingly, the center coupling portions 74 and 84 are inclined toward the rear side of the vehicle as approaching inside in the vehicle width direction.

The end portion of the inner coupling portion 72 of the front side plate 71 outside in the vehicle width direction is positioned inside in the vehicle width direction with respect to the end portion of the inner coupling portion 82 of the rear side plate 81 outside in the vehicle width direction. Similarly, the end portion of the front side plate 71 of the outer coupling portion 73 inside in the vehicle width direction is positioned inside in the vehicle width direction with respect to the end portion of the rear side plate 81 of the outer coupling portion 83 inside in the vehicle width direction. Thus, the end portions of the inner coupling portions 72 and 82 and the end portions of the outer coupling portions 73 and 83 are mutually shifted in the vehicle width direction. Accordingly, a gap 86 is formed between the center coupling portion 74 of the front side plate 71 and the center coupling portion 84 of the rear side plate 81. That is, the front side plate 71 and the rear side plate 81 overlap with one another at the inner coupling portions 72 and 82 and the outer coupling portions 73 and 83. However, the front side plate 71 and the rear side plate 81 are separated from one another at the center coupling portions 74 and 84.

The length of the straight line portion 40B and an offset amount L1, which goes along the vehicle front-rear direction between the front end 20A of the front side member 20 and the front end 40A of the apron member 40, are respectively set such that a rear end 40B1 of the above-described straight line portion 40B is positioned at the rear side of the vehicle with respect to the inner coupling portions 72 and 82 of the front side plate 71 and the rear side plate 81.

The crash box 90 is disposed between the bumper reinforcement 60 and the coupling member 70. The crash box 90 includes a mounting portion 91, the crash box inner 101 as an inner energy absorbing portion, the crash box outer 111 as an outer energy absorbing portion, and a crash box center 121.

The mounting portion 91 extends along the vehicle width direction outside portion 60A of the bumper reinforcement 60. As shown in FIG. 2, the mounting portion 91 includes a top flange 92 and a bottom flange 93, which are opposed in the vehicle top-bottom direction, and a front wall portion 94. The front wall portion 94 couples the end portions of the top flange 92 and the bottom flange 93 at the front side of the vehicle. The crash box 90 is disposed at the inside of the vehicle width direction outside portion 60A of the cross-sectional hat-shaped bumper reinforcement 60. The top flange 92 and the bottom flange 93 are coupled to the top wall portion 62 and the bottom wall portion 63 of the bumper reinforcement 60. The front wall portion 94 of the mounting portion 91 is separated from the front wall portion 64 of the bumper reinforcement 60 to the rear side of the vehicle. The bumper reinforcement 60 and the mounting portion 91 form a closed cross section 95.

Figure 4:
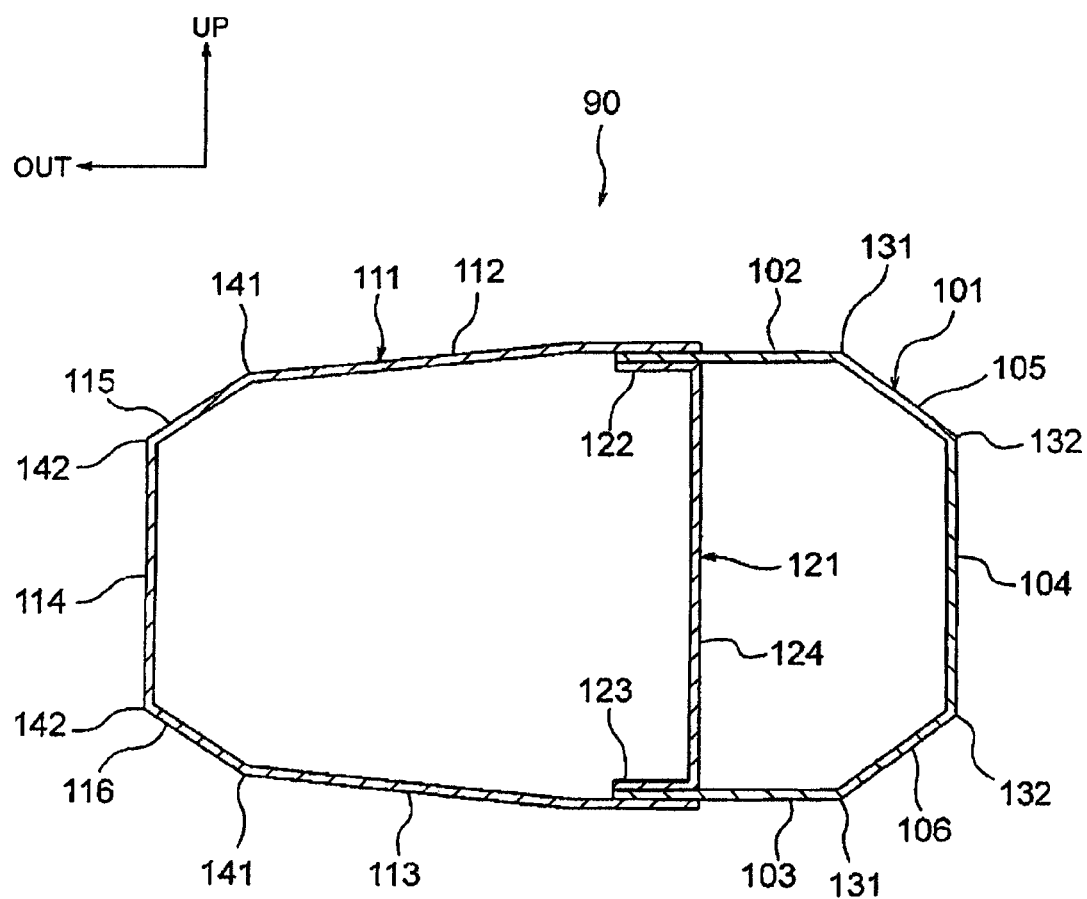
FIG. 4 is a front cross-sectional view of a crash box disposed at the structure for vehicle body front portion shown in FIG. 1.

As shown in FIG. 1, the crash box inner 101 is disposed at the front side of the vehicle with respect to the front end 20A of the front side member 20 coaxially with the front end 20A of the front side member 20. As shown in FIG. 4, the crash box inner 101 forms a cross-sectional C shape opening to outside in the vehicle width direction. That is, the crash box inner 101 includes a top wall portion 102, a bottom wall portion 103, a sidewall portion 104, and inclined wall portions 105 and 106. The top wall portion 102 and the bottom wall portion 103 are opposed in the vehicle top-bottom direction. The upper inclined wall portion 105 couples the end portion of the top wall portion 102 inside in the vehicle width direction and the end portion of the sidewall portion 104 at the top side of the vehicle. The lower inclined wall portion 106 couples the end portion of the bottom wall portion 103 inside in the vehicle width direction and the end portion of the sidewall portion 104 at the bottom side of the vehicle.

The front end of the crash box inner 101 is coupled to the above-described mounting portion 91 as shown in FIG. 1. The rear end of the crash box inner 101 is coupled to the inner coupling portion 72 of the front side plate 71 as described above. Thus, the front end and the rear end of the crash box inner 101 are respectively coupled to the mounting portion 91 and the front side plate 71. Accordingly, the crash box inner 101 couples the coupling member 70 and the vehicle width direction outside portion 60A (first coupling portion 60A1) of the bumper reinforcement 60 at the front side of the vehicle in the front end 20A of the front side member 20.

The crash box outer 111 is coaxially disposed with the front end 40A of the apron member 40 at the front side of the vehicle. As shown in FIG. 4, the crash box outer 111 forms a cross-sectional C shape opening to inside in the vehicle width direction. That is, the crash box outer 111 includes a top wall portion 112, a bottom wall portion 113, a sidewall portion 114, and inclined wall portions 115 and 116. The top wall portion 112 and the bottom wall portion 113 are opposed in the vehicle top-bottom direction. The upper inclined wall portion 115 couples the end portion of the top wall portion 112 outside in the vehicle width direction and the end portion of the sidewall portion 114 at the top side of the vehicle. The lower inclined wall portion 116 couples the end portion of the bottom wall portion 113 outside in the vehicle width direction and the end portion of the sidewall portion 114 at the bottom side of the vehicle.

The front end of the crash box outer 111 is coupled to the above-described mounting portion 91 as shown in FIG. 1. The rear end of the crash box outer 111 is coupled to the outer coupling portion 73 of the front side plate 71 as described above. Thus, the front end and the rear end of the crash box outer 111 are respectively coupled to the mounting portion 91 and the front side plate 71. Accordingly, the crash box outer 111 couples the coupling member 70 and the vehicle width direction outside portion 60A (second coupling portion 60A2) of the bumper reinforcement 60 at the front side of the vehicle in the front end 40A of the apron member 40.

As shown in FIG. 4, the crash box center 121 includes a top flange 122 and a bottom flange 123, which are opposed in the vehicle top-bottom direction, and a longitudinal wall portion 124. The longitudinal wall portion 124 couples the end portions of the top flange 122 and the bottom flange 123 inside in the vehicle width direction. The crash box center 121 is disposed inside of the above-described crash box inner 101 and the above-described crash box outer 111.

Moreover, the top flange 122, the end portion of the crash box inner 101 at the top wall portion 102 outside in the vehicle width direction, and the end portion of the crash box outer 111 at the top wall portion 112 inside in the vehicle width direction are overlapped and coupled in the vehicle top-bottom direction. Similarly, the bottom flange 123, the end portion of the crash box inner 101 at the bottom wall portion 103 outside in the vehicle width direction, and the end portion of the crash box outer 111 at the bottom wall portion 113 inside in the vehicle width direction are overlapped and coupled in the vehicle top-bottom direction. The longitudinal wall portion 124 is disposed at the same position as the sidewall portion (the front side member outer 31) of the front side member 20 inside in the vehicle width direction, in the vehicle width direction as shown in FIG. 1.

A pair of ridgelines 131 and 132 are formed at portions of the above-described crash box inner 101 inside in the vehicle width direction (that is, the coupling portion between the top wall portion 102 and the inclined wall portion 105 and the coupling portion between the inclined wall portion 105 and the sidewall portion 104), respectively. The pair of ridgelines 131 and 132 extends in the vehicle front-rear direction as a first ridgeline. A plurality of beads 133 and 134 are formed on the top wall portion 102 and the inclined wall portion 105 of the crash box inner 101, respectively. The plurality of beads 133 and 134 are disposed as first beads (recess portion) across the ridgeline 131 outside in the vehicle width direction among the above-described pair of ridgelines 131 and 132, and extend in the vehicle width direction.

Among the plurality of beads 133 and 134, the one bead 133 does not intersect with the ridgeline 132 inside in the vehicle width direction among the above-described pair of ridgelines 131 and 132. However, the other bead 134 intersects with the ridgeline 132 inside in the vehicle width direction among the above-described pair of ridgelines 131 and 132. At the sidewall portion 104, a plurality of beads 135 are formed. The plurality of beads 135 extend in the vehicle top-bottom direction and intersect with the ridgelines 132. The crash box inner 101 is symmetrically formed in the vehicle top-bottom direction. The portions similar to the above-described pair of ridgelines 131 and 132 and the plurality of beads 133 and 134 are formed at the bottom wall portion 103 and the inclined wall portion 106 (see FIG. 4), respectively.

On the other hand, a pair of ridgelines 141 and 142 are formed at portions of the crash box outer 111 outside in the vehicle width direction (that is, the coupling portion between the top wall portion 112 and the inclined wall portion 115 and the coupling portion between the inclined wall portion 115 and the sidewall portion 114), respectively. The pair of ridgelines 141 and 142 extends in the vehicle front-rear direction as a second ridgeline. The sidewall portion 53 at the above-described apron member 40 outside in the vehicle width direction is positioned between the pair of ridgelines 141 and 142 in the vehicle width direction. A plurality of beads 143 and 144 are formed on the top wall portion 112 and the inclined wall portion 115 of the crash box outer 111, respectively. The plurality of beads 143 and 144 are disposed as second beads (recess portion) across the ridgeline 141 inside in the vehicle width direction among the above-described pair of ridgelines 141 and 142, and extend in the vehicle width direction.

Among the plurality of beads 143 and 144, the one bead 143 does not intersect with the ridgeline 142 outside in the vehicle width direction among the above-described pair of ridgelines 141 and 142. However, the other bead 144 intersects with the ridgeline 142 outside in the vehicle width direction among the above-described pair of ridgelines 141 and 142. The bead 143 formed at the crash box outer 111 is formed longer than the bead 133 formed at the crash box inner 101 in the length along the vehicle width direction. Similarly, the bead 144 formed at the crash box outer 111 is formed longer than the bead 134 formed at the crash box inner 101 in the length along the vehicle width direction.

A plurality of beads 145 is formed at the sidewall portion 114. The plurality of beads 145 extend in the vehicle top-bottom direction and intersect with the ridgelines 142. The crash box outer 111 is symmetrically formed in the vehicle top-bottom direction. The portions similar to the above-described pair of ridgelines 141 and 142 and the plurality of beads 143 and 144 are formed at the bottom wall portion 113 and the inclined wall portion 116 (see FIG. 4), respectively.

As shown in FIG. 1, in the structure for vehicle body front portion 10, the offset amount L1, which goes along the vehicle front-rear direction between the front end 20A of the front side member 20 and the front end 40A of the apron member 40 is set as follows. That is, in the structure for vehicle body front portion 10, a first intersection point P1, a second intersection point P2, a first imaginary center line C1, and a second imaginary center line C2 are defined. The first imaginary center line C1 is a center line passing through the center of the crash box inner 101 in the vehicle width direction and extends in the vehicle front-rear direction. The first intersection point P1 is an intersection point of the first imaginary center line C1 and the front wall portion 64 of the bumper reinforcement 60. The second imaginary center line C2 is a center line passing through the center of the crash box outer 111 in the vehicle width direction and extends in the vehicle front-rear direction. The second intersection point P2 is an intersection point of the second imaginary center line C2 and the front wall portion 64 of the bumper reinforcement 60.

Then, in the structure for vehicle body front portion 10, dimensions of each portion is appropriately set. Accordingly, the offset amount L1, which goes along the vehicle front-rear direction between the front end 20A of the front side member 20 and the front end 40A of the apron member 40, is set smaller than an offset amount L2, which goes along the vehicle front-rear direction between the above-described first intersection point P1 and the above-described second intersection point P2.

Next, a description will be given of operations and effects according to one embodiment of the present invention.

Figure 5:
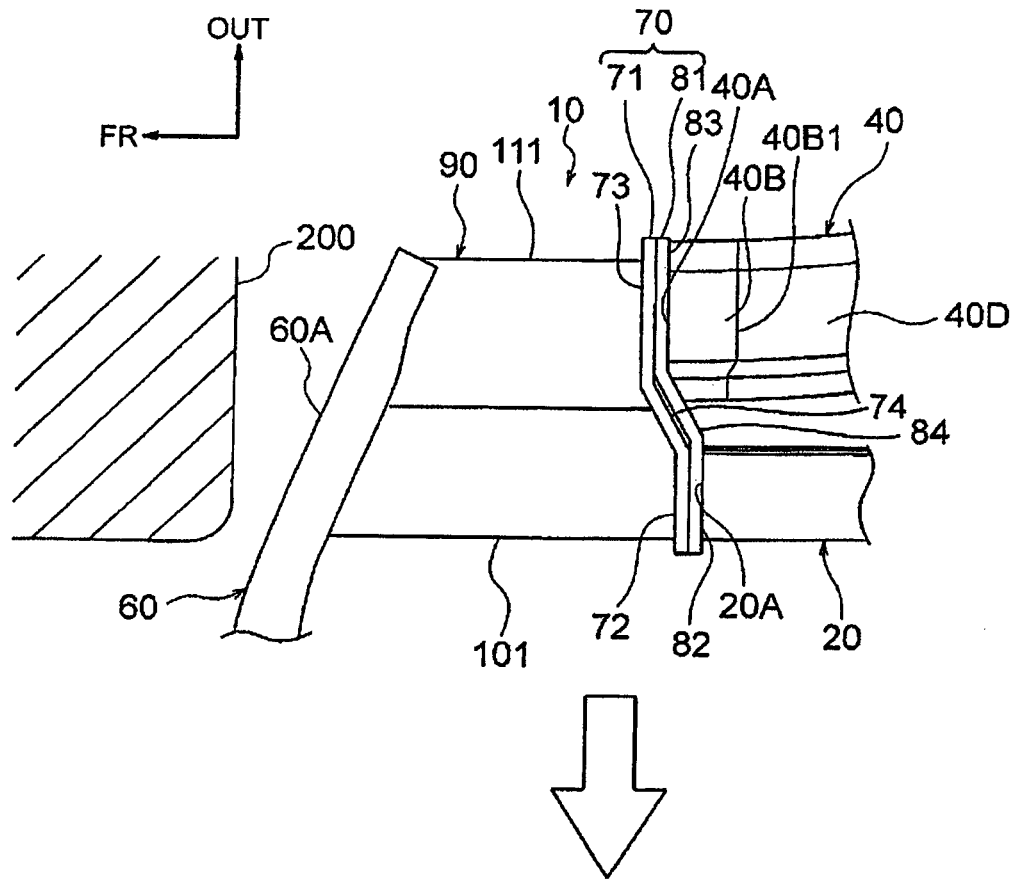
FIG. 5 is a plan view illustrating a deformation during offset collision of the structure for vehicle body front portion according to one embodiment of the present invention.
Figure 5:
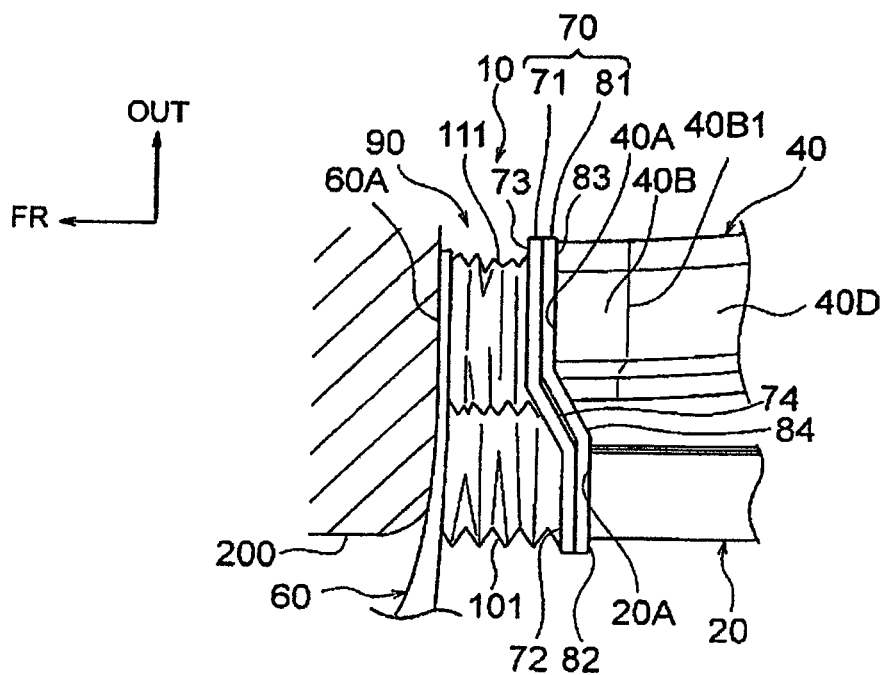

As shown in FIG. 5, in offset collision and small overlap collision, for example, in the case where a collision body 200 collides with the vehicle width direction outside portion 60A of the bumper reinforcement 60, a collision load acts on the crash box inner 101 and the crash box outer 111 from the front side of the vehicle. Here, the crash box inner 101 has longer overall length than the crash box outer 111. In view of this, in the case where the collision load acts on the crash box inner 101 and the crash box outer 111 from the front side of the vehicle, a large amount of the crash box inner 101 may remain than the outer 111. As a result, the crash box outer 111 arranged in the vehicle width direction with respect to the crash box inner 101 may remain crushed and left.

However, with the structure for vehicle body front portion 10 according to one embodiment of the present invention, the front end 40A of the apron member 40 disposed outside in the vehicle width direction of the front side member 20 is positioned at the front side of the vehicle with respect to the front end 20A of the front side member 20. Therefore, in the case where a collision load acts on the crash box inner 101 and the crash box outer 111 from the front side of the vehicle, the crash box outer 111 can be crushed. This allows reducing remaining of the uncrushed crash box outer 111, thus improving the energy absorption performance during collision.

The front end side portion including the front end 40A of the apron member 40 (front portion) forms the straight line portion 40B extending in the vehicle front-rear direction. Therefore, in the case where a collision load acts on the front end 40A of the apron member 40 from the front side of the vehicle, the straight line portion 40B can receive the collision load in the vehicle front-rear direction.

The rear end 40B1 of the straight line portion 40B is positioned at the rear side of the vehicle with respect to the inner coupling portions 72 and 82, which are coupling portions with the front end 20A of the front side member 20 at the coupling member 70. Accordingly, the straight line portion 40B can receive the collision load in the vehicle front-rear direction more effectively.

Figure 6:
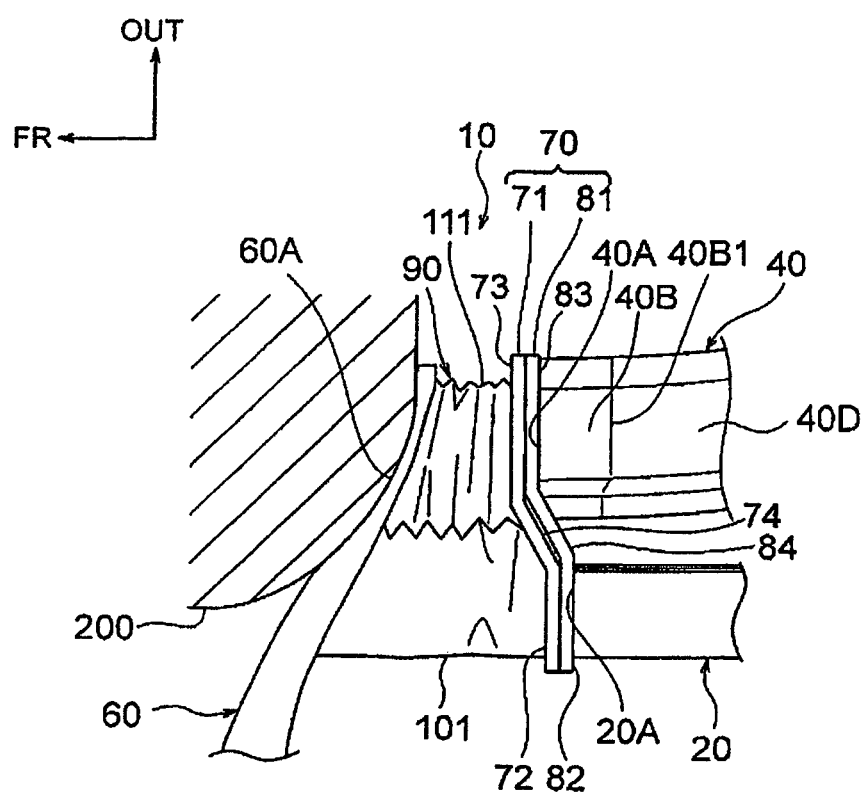
FIG. 6 is a plan view illustrating a deformed state of the structure for vehicle body front portion according to one embodiment of the present invention during a small overlap collision or oblique collision.

The coupling member 70 includes the inner coupling portions 72 and 82, the outer coupling portions 73 and 83, and the center coupling portions 74 and 84. The inner coupling portions 72 and 82 are coupled to the front end 20A of the front side member 20. The outer coupling portions 73 and 83 are coupled to the front end 40A of the apron member 40. The center coupling portions 74 and 84 couple the inner coupling portions 72 and 82 and the outer coupling portions 73 and 83. Accordingly, as shown in FIG. 6, for example, in the case where a collision load is input from the collision body 200 to the vehicle width direction outside portion 60A of the bumper reinforcement 60 in a range overlapping with the apron member 40 in the vehicle width direction such as small overlap collision or oblique collision, the collision load transmitted to the outer coupling portions 73 and 83 via the crash box outer 111 can be transmitted to the inner coupling portions 72 and 82 via the center coupling portions 74 and 84. Consequently, the collision load input to the vehicle width direction outside portion 60A of the bumper reinforcement 60 in the range overlapping with the apron member 40 in the vehicle width direction can be dispersed to the apron member 40 and the front side member 20.

Furthermore, the outer coupling portions 73 and 83 are positioned at the front side of the vehicle with respect to the inner coupling portions 72 and 82. Therefore, the collision load transmitted to the outer coupling portions 73 and 83 via the crash box outer 111 can be efficiently transmitted to the inner coupling portions 72 and 82 via the center coupling portions 74 and 84.

The center coupling portions 74 and 84 are inclined toward the rear side of the vehicle as approaching the inside in the vehicle width direction. Accordingly, the collision load transmitted to the outer coupling portions 73 and 83 via the crash box outer 111 can be more efficiently transmitted to the inner coupling portions 72 and 82 via the center coupling portions 74 and 84.

As shown in FIG. 1, the front side plate 71 and the rear side plate 81 at the coupling member 70 overlap with one another at the inner coupling portions 72 and 82 and the outer coupling portions 73 and 83. However, the front side plate 71 and the rear side plate 81 are separated from one another at the center coupling portions 74 and 84. Accordingly, when the front side plate 71 and the rear side plate 81 are assembled (when the front side plate 71 and the rear side plate 81 are overlapped with one another at the inner coupling portions 72 and 82 and the outer coupling portions 73 and 83), the front side plate 71 and the rear side plate 81 can be inhibited to interfere at the center coupling portions 74 and 84. This allows improving assemblability of the front side plate 71 and the rear side plate 81.

The offset amount L1, which goes along the vehicle front-rear direction between the front end 20A of the front side member 20 and the front end 40A of the apron member 40, is set smaller than the offset amount L2, which goes along the vehicle front-rear direction between the above-described first intersection point P1 and the above-described second intersection point P2. Therefore, the overall length of the crash box outer 111 can be ensured, thus ensuring energy absorption performance in the crash box outer 111.

The pair of ridgelines 141 and 142 is formed at portions of the crash box outer 111 outside in the vehicle width direction, respectively. The pair of ridgelines 141 and 142 is arranged in the vehicle width direction and extends in the vehicle front-rear direction. The sidewall portion 53 at the apron member 40 outside in the vehicle width direction (see FIG. 3) is positioned between the pair of ridgelines 141 and 142 in the vehicle width direction. Accordingly, the collision load acting on the crash box outer 111 can be efficiently transmitted to the sidewall portion 53 of the apron member 40 via the pair of ridgelines 141 and 142.

The bead 143 (second bead) formed at the crash box outer 111 and extending in the vehicle width direction is formed longer than the bead 133 (first bead) formed at the crash box inner 101 corresponding to the bead 143 in the length along the vehicle width direction. Similarly, the bead 144 (second bead) formed at the crash box outer 111 and extending in the vehicle width direction is formed longer than the bead 134 (first bead) formed at the crash box inner 101 corresponding to the bead 144 in the length along the vehicle width direction. Therefore, in the case where a collision load acts on the crash box outer 111 from the front side of the vehicle, the crash box outer 111 can be more crushed.

As described above, with the structure for vehicle body front portion 10, the front end 40A of the apron member 40 is positioned at the front side of the vehicle with respect to the front end 20A of the front side member 20. Accordingly, as shown in FIG. 6, even if a collision load is input from the collision body 200 to the vehicle width direction outside portion 60A of the bumper reinforcement 60 in a range overlapping with the apron member 40 in the vehicle width direction such as small overlap collision or oblique collision, for example, rising of a load (reactive force) generated at the front end 40A of the apron member 40 can be advanced.

Figure 7:
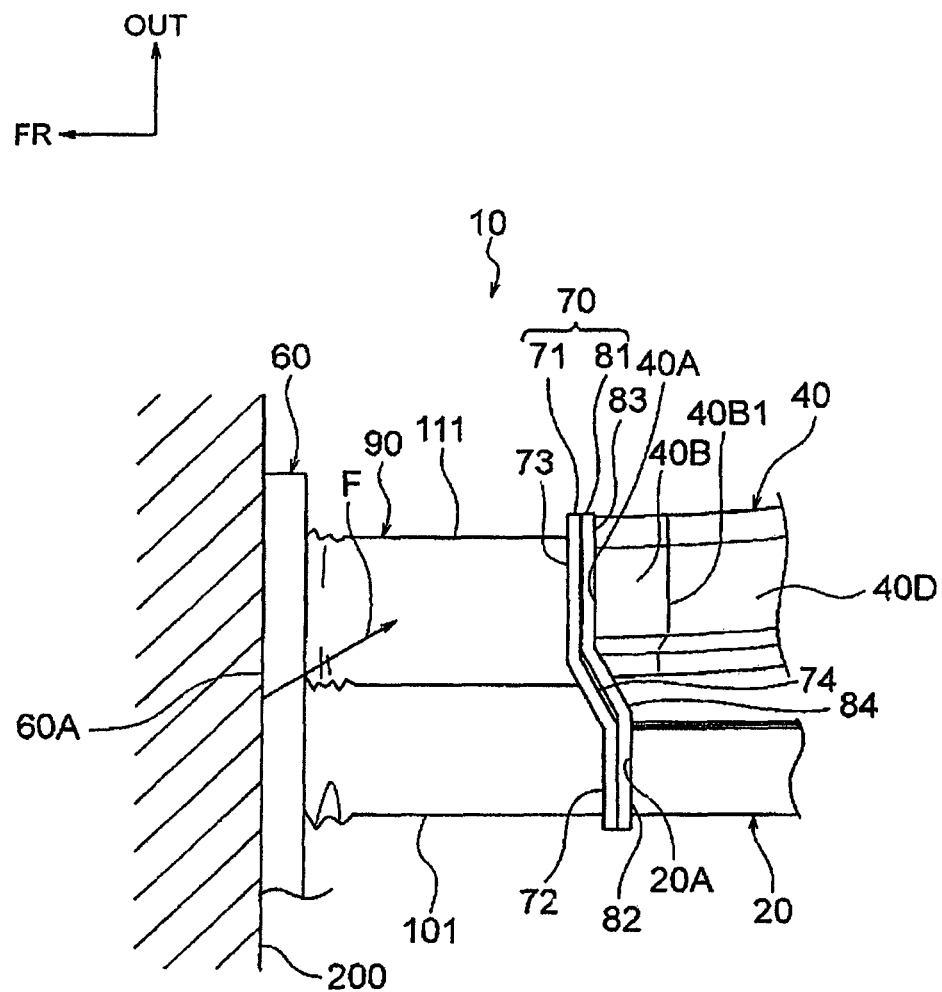
FIG. 7 is a plan view illustrating a deformed state of the structure for vehicle body front portion according to one embodiment of the present invention during front collision.

Moreover, as shown in FIG. 7, even if a collision load F is input from the collision body 200 to the vehicle width direction outside portion 60A of the bumper reinforcement 60 at outside the vehicle width direction and the rear side of the vehicle, falling of the crash box inner 101 and the crash box outer 111 can be restricted. This allows stably crushing the crash box inner 101 and the crash box outer 111.

Next, a description will be given of a modification according to one embodiment of the present invention.

According to one embodiment of the present invention, the first coupling portion 60A1 and the second coupling portion 60A2 are formed by inclination of the vehicle width direction outside portion 60A of the bumper reinforcement 60 toward the rear side of the vehicle as the vehicle width direction outside portion 60A approaches outside in the vehicle width direction. However, the first coupling portion 60A1 and the second coupling portion 60A2 may be formed by forming the vehicle width direction outside portion 60A in steps, for example.

Figure 8:
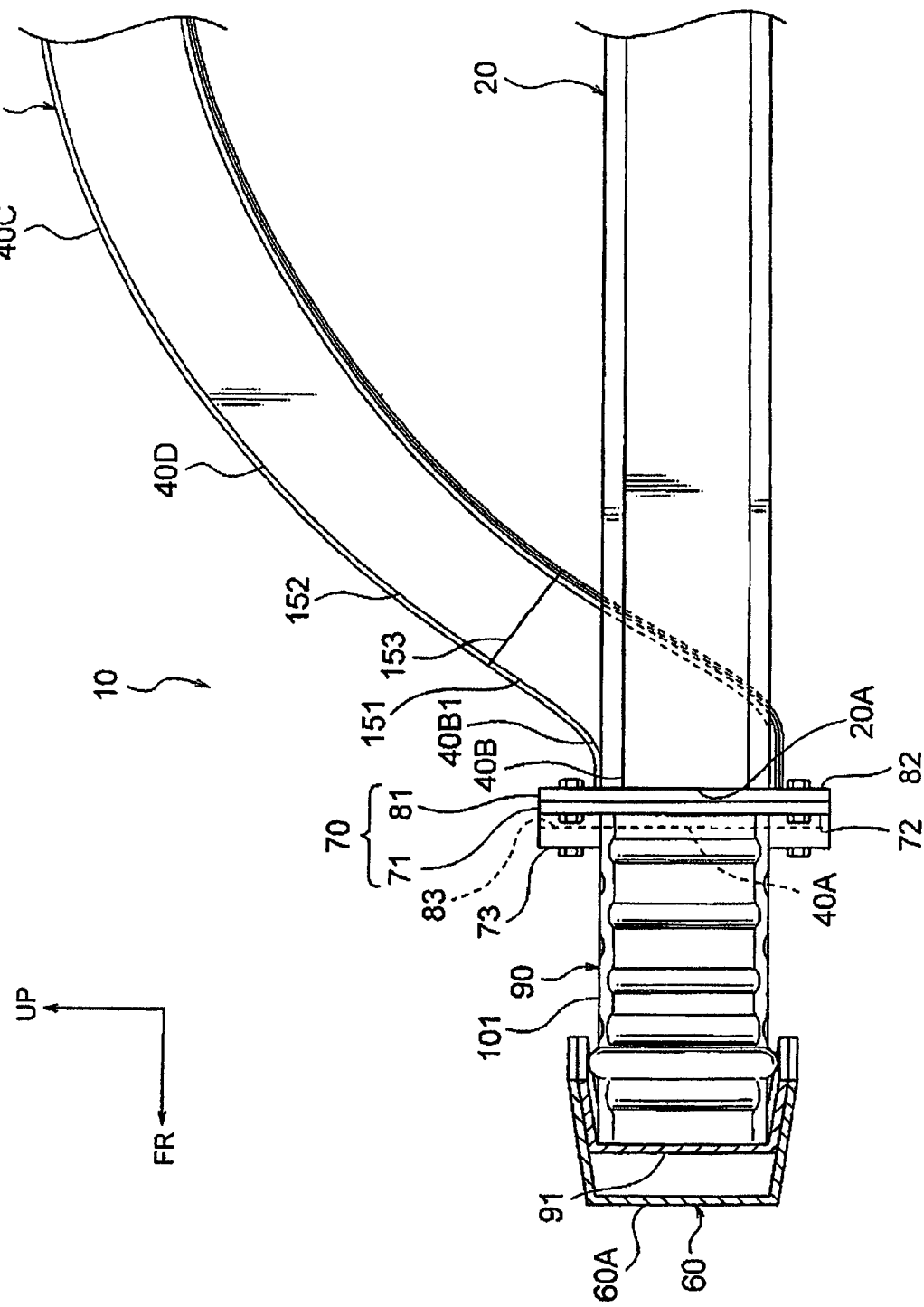
FIG. 8 is a side view illustrating a first modification of the structure for vehicle body front portion according to one embodiment of the present invention.

The apron member 40 is continuously formed across the overall length. However, as shown in FIG. 8, the extending portion 40D may include a boundary 153 that divides the apron member 40 into a front divided portion 151 and a rear divided portion 152. With this configuration, in the case where, for example, a collision load acts on the apron member 40 from the front side of the vehicle and then only the front divided portion 151 is deformed, it is only necessary to exchange the front divided portion 151. This allows improving repairability of the apron member 40.

Moreover, when the boundary 153 is formed at the extending portion 40D, the apron member 40 can be divided into the front divided portion 151 and the rear divided portion 152 to an appropriate length. Accordingly, compared with the case where the apron member 40 is continuously formed across the overall length, the apron member 40 can be easily manufactured.

In the case where the boundary 153 is formed at the extending portion 40D of the apron member 40, the front divided portion 151 of the apron member 40 may be the straight line portion 40B extending in the vehicle front-rear direction. Thus, in the case where the boundary 153 is formed at the extending portion 40D and the straight line portion 40B is continuously formed across the overall length, the straight line portion 40B can efficiently receive the collision load in the vehicle front-rear direction.

Figure 9:
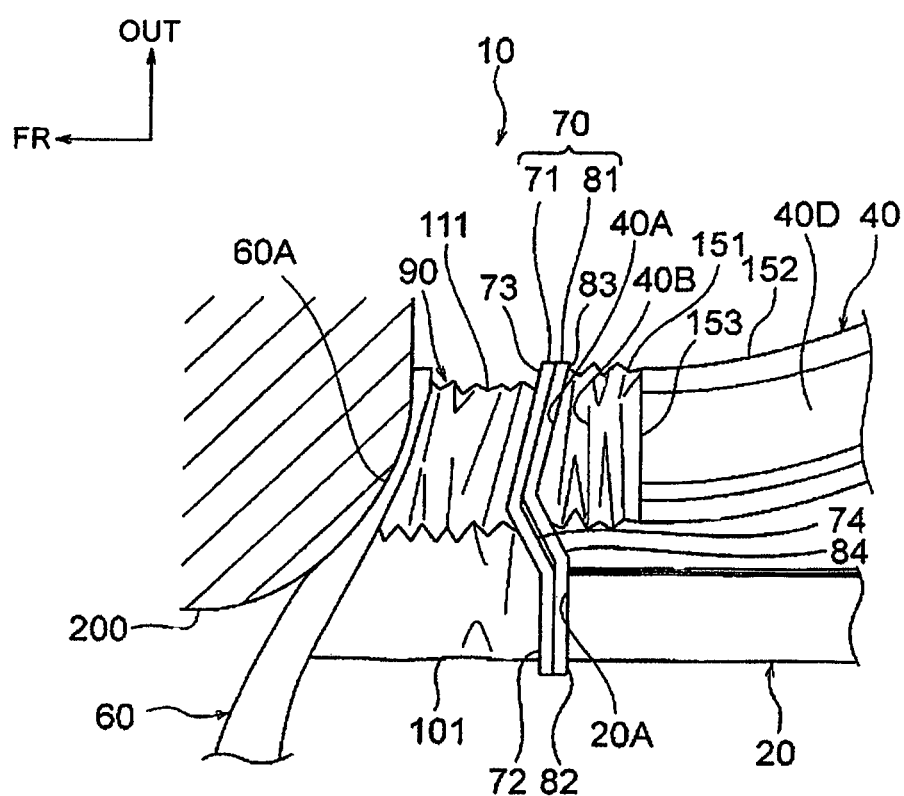
FIG. 9 is a plan view illustrating a deformed state of the structure for vehicle body front portion shown in FIG. 8 during small overlap collision or oblique collision.

In the case where the boundary 153 is formed at the extending portion 40D of the apron member 40, the front divided portion 151 may be formed at low strength compared with the rear divided portion 152. Thus, an example of forming the front divided portion 151 at low strength compared with the rear divided portion 152 includes such as the following. The thickness of the front divided portion 151 formed with the same material as the rear divided portion 152 is formed thinner than the rear divided portion 152. Alternatively, the front divided portion 151 is formed of a material with lower strength than the material of the rear divided portion 152. With this configuration, as shown in FIG. 9, in the case where a collision load acts on the crash box outer 111 from the collision body 200, the front divided portion 151 (portion of low strength) can absorb energy during collision in addition to the crash box outer 111.

According to one embodiment of the present invention, the extending portion 40D is formed between the vehicle front-rear direction middle portion 40C and the straight line portion 40B (front portion) of the apron member 40 (see FIG. 2). However, the portion between the vehicle front-rear direction middle portion 40C and the front end 40A of the apron member 40 may be the extending portion 40D toward the bottom side of the vehicle as approaching the front side of the vehicle (the straight line portion 40B may be eliminated). With this configuration, when a collision load acts on the front end 40A of the apron member 40 from the front side of the vehicle, the collision load can be transmitted to the extending portion 40D at the shortest distance.

Figure 10:
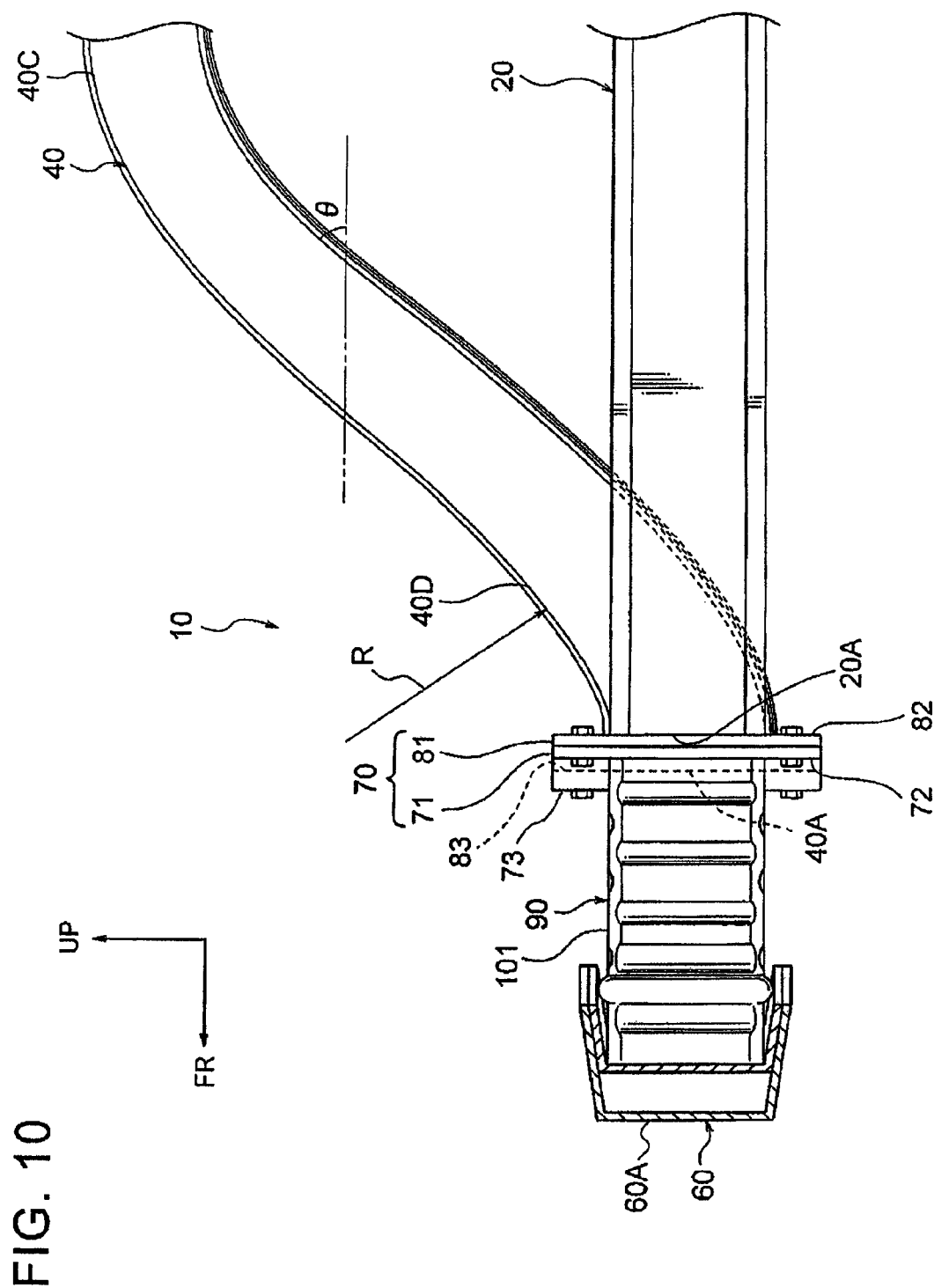
FIG. 10 is a side view illustrating a second modification of the structure for vehicle body front portion according to one embodiment of the present invention.

According to one embodiment of the present invention, the extending portion 40D curves to form a convex toward the front side of the vehicle and the top side of the vehicle. However, as shown in FIG. 10, the extending portion 40D may curve to form a convex toward the rear side of the vehicle and the bottom side of the vehicle.

Here, as described above, the front end 40A of the apron member 40 is positioned at the front side of the vehicle with respect to the front end 20A of the front side member 20 (see also FIG. 1). Accordingly, as shown in FIG. 10, in the case where the extending portion 40D curves to form a convex toward the rear side of the vehicle and the bottom side of the vehicle, compared with the case where, for example, the front end 40A of the apron member 40 is disposed at the same position with the front end 20A of the front side member 20, a curvature radius R at the extending portion 40D can be increased. This allows reducing stress concentration on the extending portion 40D in the case where a collision load acts on the front end 40A of the apron member 40 from the front side of the vehicle.

It is also assumed that the curvature radius R at the extending portion 40D is the same in the case where the front end 40A of the apron member 40 is positioned at the front side of the vehicle with respect to the front end 20A of the front side member 20 as this embodiment and in the case where the front end 40A of the apron member 40 is disposed at the same positioned as the front end 20A of the front side member 20 as the related art. However, like this example, in the case where the front end 40A of the apron member 40 is positioned at the front side of the vehicle with respect to the front end 20A of the front side member 20, an inclination angle $\theta$ of the extending portion 40D relative to the horizontal direction can be reduced. This allows receiving the collision load in the vehicle front-rear direction at the portion at the front end side of the extending portion 40D.

According to one embodiment of the present invention, the structure for vehicle body front portion 10 includes the crash box 90 that integrally includes the crash box inner 101 as an inner energy absorbing portion and the crash box outer 111 as an outer energy absorbing portion. However, the inner energy absorbing portion corresponding to the crash box inner 101 and the outer energy absorbing portion corresponding to the crash box outer 111 may be formed as separate bodies and may be separated in the vehicle width direction.

Figure 11:
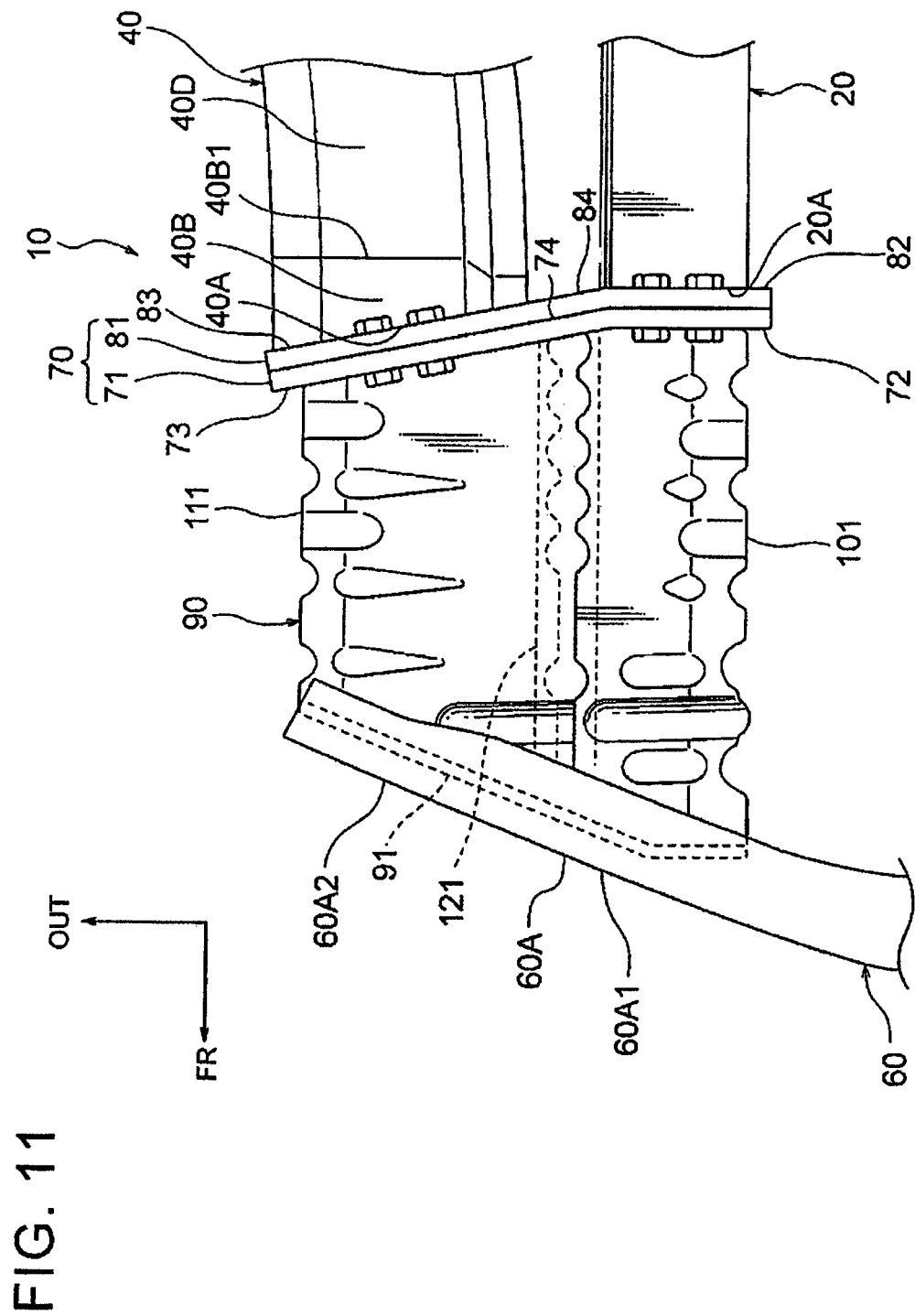
FIG. 11 is a side view illustrating a third modification of the structure for vehicle body front portion according to one embodiment of the present invention.

According to one embodiment of the present invention, the outer coupling portions 73 and 83 are perpendicular to the vehicle front-rear direction. However, as shown in FIG. 11, the outer coupling portions 73 and 83 may be inclined toward the rear side of the vehicle as approaching inside in the vehicle width direction, similarly to the center coupling portions 74 and 84. In this case, the outer coupling portions 73 and 83 and the center coupling portions 74 and 84 may be formed in a straight line in plan view. According to one embodiment of the present invention, the outer coupling portions 73 and 83 may be formed in steps.

The offset amount L1, which goes along the vehicle front-rear direction between the front end 20A of the front side member 20 and the front end 40A of the apron member 40, is set smaller than the offset amount L2, which goes along the vehicle front-rear direction between the above-described first intersection point P1 and the above-described second intersection point P2. However, the offset amount L1 may be set to the same as the offset amount L2 (including approximately the same).

Here, as described above, the case where the offset amount L1 and the offset amount L2 are set to the same will be described below. That is, as shown in FIG. 1, a length along the vehicle front-rear direction between the inner coupling portion 72 and the first intersection point P1 is denoted as La while a length along the vehicle front-rear direction between the outer coupling portion 73 and the second intersection point P2 is denoted as Lb. A ratio of remaining of the uncrushed crash box inner 101 and the crash box outer 111 is denoted as P. Then, a state where the remaining uncrushed amounts of the crash box inner 101 and the crash box outer 111 are equal is expressed by $La \times P = Lb \times P + L1$. Here, $Lb = La - (L1 + L2)$ is met; therefore, $L1 = L2 \times P/(1 \cdot P)$ is met. When $P = 0.5$, $L1 = L2$.

Accordingly, as described above, in the case where the offset amount L1 and the offset amount L2 are set to the same and the ratio of remaining of the uncrushed P is 0.5, the remaining uncrushed amounts of the crash box inner 101 and the crash box outer 111 can be approximately equal. This can increase an amount of absorbing an impact by the crash box inner 101 and the crash box outer 111.

Here, the case where the offset amount L1 is set to the same as the offset amount L2 is described. However, the offset amount L1 may be set larger than the offset amount L2.

In the above plurality of modifications, modifications that can be combined may properly be combined and embodied.

Although one embodiment of the present invention is described above, the present invention is not limited to the above embodiments. As well as the above-described embodiments, various modifications can be made without departing from the scope of the present invention.

What is claimed is:

1. A structure for vehicle body front portion comprising:
   a front side member;
   an apron member disposed outside in a vehicle width direction with respect to the front side member, the apron member including a front end positioned at a front side of a vehicle with respect to a front end of the front side member;
   a bumper reinforcement disposed at the front side of the vehicle with respect to the front side member and the apron member, the bumper reinforcement extending in a vehicle width direction, the bumper reinforcement including a vehicle width direction outside portion with a first coupling portion and a second coupling portion, the second coupling portion being positioned outside in the vehicle width direction and a rear side of the vehicle with respect to the first coupling portion;
   a coupling member that couples the front end of the front side member and the front end of the apron member;
   an inner energy absorbing portion disposed at the front end of the front side member at the front side of the vehicle, the inner energy absorbing portion coupling the coupling member and the first coupling portion; and an outer energy absorbing portion disposed at the front end of the apron member at the front side of the vehicle, the outer energy absorbing portion coupling the coupling member and the second coupling portion.

2. The structure for vehicle body front portion according to claim 1, wherein
the apron member includes an extending portion between a vehicle front-rear direction middle portion and a front portion of the apron member, the extending portion heading for a bottom side of the vehicle as approaching the front side of the vehicle, and the front portion of the apron member forms a straight line portion extending in a vehicle front-rear direction.

3. The structure for vehicle body front portion according to claim 2, wherein
the extending portion includes a boundary to divide the apron member into a front divided portion and a rear divided portion.

4. The structure for vehicle body front portion according to claim 3, wherein
the front divided portion has a lower strength than the rear divided portion.

5. The structure for vehicle body front portion according to claim 2, wherein
the coupling member includes an inner coupling portion and an outer coupling portion, the inner coupling portion being coupled to the front end of the front side member, the outer coupling portion being positioned at the front side of the vehicle with respect to the inner coupling portion, the outer coupling portion being coupled to the front end of the apron member, and
the straight line portion has a rear end positioned at a rear side of the vehicle with respect to the inner coupling portion.

6. The structure for vehicle body front portion according to claim 2, wherein
the extending portion curves to form a convex toward a rear side of the vehicle and the bottom side of the vehicle.

7. The structure for vehicle body front portion according to claim 1, wherein
the coupling member includes an inner coupling portion, an outer coupling portion, and a center coupling portion, the inner coupling portion being coupled to a rear end of the inner energy absorbing portion and the front end of the front side member, the outer coupling portion being positioned at the front side of the vehicle with respect to the inner coupling portion, the outer coupling portion being coupled to a rear end of the outer energy absorbing portion and the front end of the apron member, the center coupling portion coupling the inner coupling portion and the outer coupling portion.

8. The structure for vehicle body front portion according to claim 7, wherein
the center coupling portion is inclined toward the rear side of the vehicle as approaching inside in the vehicle width direction.

9. The structure for vehicle body front portion according to claim 8, wherein
the coupling member includes a front side plate and a rear side plate divided in a vehicle front-rear direction, and
the front side plate and the rear side plate overlap with one another at the inner coupling portion and the outer coupling portion while separated from one another at the center coupling portion.

10. The structure for vehicle body front portion according to claim 1, wherein
the outer energy absorbing portion includes a pair of ridgelines that are formed at portion of outside in the vehicle width direction and being arranged in the vehicle width direction and each extending in the vehicle front-rear direction, and
the apron member includes a sidewall portion that is positioned outside in the vehicle width direction and being positioned between the pair of ridgelines in the vehicle width direction.

11. The structure for vehicle body front portion according to claim 1, wherein
the inner energy absorbing portion includes a first ridgeline and a first bead, the first ridgeline extending in the vehicle front-rear direction, the first bead being across the first ridgeline and extending in the vehicle width direction, and
the outer energy absorbing portion includes a second ridgeline and a second bead, the second ridgeline extending in the vehicle front-rear direction, the second bead being across the second ridgeline and extending in the vehicle width direction, wherein
the second bead has a length longer than the first bead along the vehicle width direction.

* * * * *